US009816761B2

United States Patent
Suzuki et al.

(10) Patent No.: US 9,816,761 B2
(45) Date of Patent: Nov. 14, 2017

(54) METHOD FOR MANUFACTURING HEAT EXCHANGER

(75) Inventors: Wataru Suzuki, Tokyo (JP); Kazuyoshi Takayama, Tokyo (JP); Tomohiko Takahashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 447 days.

(21) Appl. No.: 14/399,644

(22) PCT Filed: Jun. 29, 2012

(86) PCT No.: PCT/JP2012/004242
§ 371 (c)(1),
(2), (4) Date: Nov. 7, 2014

(87) PCT Pub. No.: WO2014/002147
PCT Pub. Date: Jan. 3, 2014

(65) Prior Publication Data
US 2015/0114613 A1    Apr. 30, 2015

(51) Int. Cl.
*F28F 1/12* (2006.01)
*F28F 1/32* (2006.01)
(Continued)

(52) U.S. Cl.
CPC .............. *F28F 1/32* (2013.01); *B21D 53/085* (2013.01); *B23P 15/26* (2013.01);
(Continued)

(58) Field of Classification Search
CPC ...... F28F 1/32; F28F 1/325; F28F 1/02; F28F 2215/12; F28F 2275/10; B23P 15/26; B21D 53/085; F28D 1/05366; Y10T 29/4938
See application file for complete search history.

(56) References Cited

U.S. PATENT DOCUMENTS

| 8,782,891 | B2 * | 7/2014 | Sekine | B23K 3/087 29/726 |
| 2006/0231244 | A1 * | 10/2006 | Sekine | B23K 3/087 165/173 |
| 2012/0222293 | A1 * | 9/2012 | Ueda | B21D 53/022 29/727 |

FOREIGN PATENT DOCUMENTS

EP    1 361 405 A2    11/2003
JP    S64-40210 A    2/1989
(Continued)

OTHER PUBLICATIONS

English translation of JP-06-050688.*
(Continued)

*Primary Examiner* — Jun Yoo
(74) *Attorney, Agent, or Firm* — Posz Law Group, PLC

(57) ABSTRACT

A method for manufacturing a heat exchanger is provided. The heat exchanger includes a plurality of plate-like fins that are stacked with a predetermined fin pitch, and a plurality of flat heat exchanger tubes that are disposed with a predetermined spacing from one another along the longitudinal direction of the plate-like fins and extend through the plate-like fins along the stacking direction. The plate-like fins each have a plurality of notches provided in an end portion along the long side. The plate-like fins have a shape corresponding to the cross-sectional shape of the flat heat exchanger tubes, and the flat heat exchanger tubes are inserted into the notches. The manufacturing method includes disposing the flat heat exchanger tubes with a predetermined spacing from one another, and attaching the plate-like fins to the flat heat exchanger tubes one by one by inserting the flat heat exchanger tubes into the notches of each of the plate-like fins.

4 Claims, 4 Drawing Sheets

(51) Int. Cl.
| | |
|---|---|
| *F28D 1/053* | (2006.01) |
| *F28F 1/02* | (2006.01) |
| *B21D 53/08* | (2006.01) |
| *B23P 15/26* | (2006.01) |

(52) U.S. Cl.
CPC ............ *F28D 1/05366* (2013.01); *F28F 1/02* (2013.01); *F28F 1/325* (2013.01); *F28F 2215/12* (2013.01); *F28F 2275/10* (2013.01); *Y10T 29/4938* (2015.01)

(56) References Cited

FOREIGN PATENT DOCUMENTS

| | | |
|---|---|---|
| JP | H05-340680 A | 12/1993 |
| JP | H06-50688 A | 2/1994 |
| JP | H10-89870 A | 4/1998 |
| JP | 2008-121921 A | 5/2008 |
| JP | 2010-19534 A | 1/2010 |
| JP | 2011-145023 A | 7/2011 |
| JP | 2012-030284 A | 2/2012 |

OTHER PUBLICATIONS

English translation of JP-2012-030284.*
Office Action dated Jun. 9, 2015 in the corresponding JP application No. 2014-522230 (with English translation).
Office Action dated Jan. 5, 2016 in the corresponding JP application No. 2014-522230 (with English translation).
Office Action dated Dec. 16, 2015 in the corresponding CN application No. 201280073548.8 (with English translation).
International Search Report of the International Searching Authority dated Sep. 25, 2012 for the corresponding international application No. PCT/JP2012/004242 (and English translation).

* cited by examiner

METHOD FOR MANUFACTURING HEAT EXCHANGER

CROSS REFERENCE TO RELATED APPLICATION

This application is a U.S. national stage application of International Application No. PCT/JP2012/004242 filed on Jun. 29, 2012, the disclosure of which is incorporated by reference.

TECHNICAL FIELD

The present invention relates to a method for manufacturing a heat exchanger, a heat exchanger, and an air-conditioning apparatus.

BACKGROUND ART

Conventionally, there have been proposed heat exchangers (hereinafter, also referred to as fin-and-tube heat exchangers) including a plurality of plate-like fins that are stacked with a predetermined fin pitch, and a plurality of heat exchanger tubes that are disposed with a predetermined spacing from one another along the longitudinal direction of the plate-like fins and extend through the plate-like fins along the stacking direction. Further, some of the conventional fin-and-tube heat exchangers proposed use, as a heat exchanger tube, a heat exchanger tube whose cross-section is flat-shaped (hereinafter, also referred to as flat heat exchanger tube).

As an example of conventional fin-and-tube heat exchangers using such a flat heat exchanger tube, in order to minimize performance degradation of the heat exchanger caused by deformation of the plate-like fins or unevenness or any inappropriateness in the fin pitch between the plate-like fins, which occurs during assembling of the heat exchanger, the following heat exchanger has been proposed: "A heat exchanger is formed by integrally brazing the following components: a plurality of plate-like fins 1 that are arranged with a spacing as appropriate; a plurality of tapered flat heat exchanger tubes 3 that are parallel to each other and extend through tapered insertion grooves 2 provided in each of the plate-like fins 1; and a pair of headers 4 and 5 formed by pipes that are disposed with a spacing from each other and communicate with the flat heat exchanger tubes 3. As illustrated in FIG. 3, the insertion grooves 2 provided in each of the plate-like fins 1 are open on one side of each of the plate-like fins 1, and are formed in such a shape that gradually narrows toward the inner side from this one side. That is, the insertion grooves 2 are formed in a tapered shape whose opening-side end portion has a widened portion 2a and whose other end portion has a narrowed portion 2b. The cross-section of the flat heat exchanger tubes 3 has a tapered shape that allows intimate contact of the flat heat exchanger tubes 3 with the narrowed portion 2b side of the insertion grooves 2" (see Patent Literature 1).

The heat exchanger described in Patent Literature 1 is manufactured by the following method: "To assemble the heat exchanger, first, a predetermined number of plate-like fins 1, for example, 500 plate-like fins 1 are set at predetermined intervals between a pair of jigs (not illustrated), in a state in which erected pieces 10 of adjacent plate-like fins 1 are brought into abutment with each other. The jig is also provided with tapered insertion grooves similar to the tapered insertion grooves 2 provided in each of the plate-like fins 1. Next, as illustrated in FIG. 6(a), a narrowed portion 3b of each of the flat heat exchanger tubes 3 is inserted into the widened portion 2a side of the corresponding insertion groove 2. After the narrowed portion 3b of each of the flat heat exchanger tubes 3 is inserted into the widened portion 2a of the corresponding insertion groove 2, by moving the plate-like fins 1 and the flat heat exchanger tubes 3 relatively, that is, in the direction of the long axis of each of the insertion grooves 2 and the flat heat exchanger tubes 3, the narrowed portion 3b of each of the flat heat exchanger tubes 3 is moved to the narrowed portion 2b side of the corresponding insertion groove 2, thereby bringing each of the flat heat exchanger tubes 3 into intimate contact with the narrowed portion 2b side of the corresponding insertion groove 2 (see FIG. 6(b)). In this case, the widened portion 2a of each of the insertion grooves 2 and the widened portion 3a of the corresponding flat heat exchanger tube 3 are also brought into intimate contact with each other".

CITATION LIST

Patent Literature

Patent Literature 1: Japanese Unexamined Patent Application Publication No. 10-089870 (paragraphs [0021], [0022], [0025], [0026], FIGS. 1 to 6)

SUMMARY OF INVENTION

Technical Problem

As described above, the heat exchanger described in Patent Literature 1 is assembled by disposing the plate-like fins at a predetermined fin pitch, and then inserting the flat heat exchanger tubes into the corresponding insertion grooves (notches) formed in an end portion along the long side of these plate-like fins. However, when disposing the plate-like fins at a predetermined fin pitch, the plate-like fins warp because the plate-like fins are thin plates, making it difficult to dispose the plate-like fins with good accuracy. Consequently, upon disposing the plate-like fins at a predetermined fin pitch, there occur variations in the positions of the insertion grooves (notches) of individual plate-like fins into which the same flat heat exchanger tube is to be inserted. Therefore, with the method for manufacturing a heat exchanger described in Patent Literature 1, when attempting to insert the flat heat exchanger tubes into these insertion grooves (notches), deformation of the plate-like fins or unevenness or any inappropriateness in fin pitch still occurs owing to the force exerted when inserting the flat heat exchanger tubes. Consequently, the ventilation resistance increases, leading to performance degradation of the heat exchanger.

The present invention has been made to solve the above-mentioned problems. It is a first object of the present invention to provide a method for manufacturing a heat exchanger which allows deformation of the plate-like fins or occurrence of unevenness or any inappropriateness in fin pitch to be reduced during assembling of the heat exchanger in comparison to related art, thereby minimizing performance degradation of the heat exchanger in comparison to related art. Further, it is a second object of the present invention to provide a heat exchanger manufactured by the method for manufacturing a heat exchanger, and an air-conditioning apparatus including this heat exchanger.

Solution to Problem

A method for manufacturing a heat exchanger according to the present invention relates to a method for manufacturing a heat exchanger that includes a plurality of plate-like fins stacked with a predetermined fin pitch, and a plurality of heat exchanger tubes that are disposed with a predetermined spacing from one another along the longitudinal direction of the plate-like fins and extend through the plate-like fins along the stacking direction. The heat exchanger tubes have a flat-shaped cross-section, the plate-like fins each have a plurality of first notches formed in an end portion along the long side and having a shape corresponding to the shape of the cross-section of the heat exchanger tubes, and the heat exchanger tubes are inserted into the first notches. The method includes disposing the heat exchanger tubes with a predetermined spacing from one another, and attaching the plate-like fins to the heat exchanger tubes one by one, by inserting the heat exchanger tubes into the first notches of each of the plate-like fins.

Advantageous Effects of Invention

In the heat exchanger according to the present invention, the heat exchanger tubes are disposed with a predetermined spacing from one another, and the plate-like fins are attached to these heat exchanger tubes one by one in such a way that the plate-like fins are disposed at a predetermined fin pitch. Therefore, the present invention allows deformation of the plate-like fins or occurrence of unevenness or any inappropriateness in fin pitch during assembling of the heat exchanger to be reduced in comparison to related art, thereby minimizing performance degradation of the heat exchanger in comparison to related art. As a result, the present invention can provide a high-performance heat exchanger.

DESCRIPTION OF EMBODIMENTS

Embodiment 1

Figure 1:
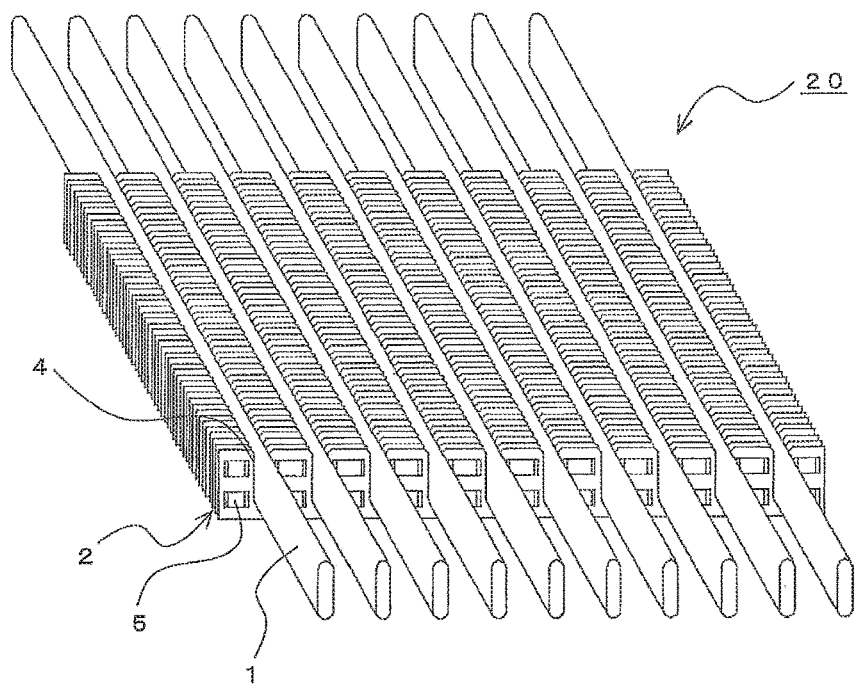
FIG. 1 is perspective view illustrating a heat exchanger according to Embodiment 1 of the present invention.

FIG. 1 is perspective view illustrating a heat exchanger according to Embodiment 1 of the present invention.

A heat exchanger 20 according to Embodiment 1 is a fin-and-tube heat exchanger including a plurality of plate-like fins 2 and a plurality of flat heat exchanger tubes 1. The plate-like fins 2 are stacked with a predetermined fin pitch. The flat heat exchanger tubes 1 are disposed with a predetermined spacing from one another along the longitudinal direction of the plate-like fins 2, and extend through the plate-like fins 2 along the stacking direction of the plate-like fins 2.

The plate-like fins 2 are, for example, thin plates having a substantially rectangular parallelepiped shape. Each of the plate-like fins 2 has a plurality of cut-and-raised slits 5 formed on its surface. The cut-and-raised slits 5 open toward the direction of circulation of air flowing between the plate-like fins 2 (in other words, in the short direction of the plate-like fins 2). By forming the cut-and-raised slits 5, the thermal boundary layer on the surface of the plate-like fins 2 can be split/updated, thereby improving the efficiency of heat transfer between air flowing between the plate-like fins 2 and each of the plate-like fins 2. A plurality of notches 4 are formed with a predetermined spacing from one another in an end portion along the long side of each of the plate-like fins 2. The notches 4 are portions in which the flat heat exchanger tubes 1 described later are inserted. The notches 4 have a shape corresponding to the cross-sectional shape of the flat heat exchanger tubes 1. In Embodiment 1, the cross-sectional shape of the flat heat exchanger tubes 1 is an elongated circle (a shape obtained by joining two circles of the same diameter by tangents). Accordingly, the notches 4 are formed in the shape of a U-shaped groove.

Each of the notches 4 corresponds to a first notch according to the present invention.

The flat heat exchanger tubes 1 are tubes in which a refrigerant that exchanges heat with the air flowing between the plate-like fins 2 flows. As described above, the cross-section of the flat heat exchanger tubes 1 has a flat shape (for example, the shape of an elongated circle). The flat heat exchanger tubes 1 are inserted in the corresponding notches 4 of each of the plate-like fins 2.

(Manufacturing Method for the Heat Exchanger 20)

The heat exchanger 20 configured as mentioned above is assembled as follows. In the following, a manufacturing process for a conventional heat exchanger will be described prior to describing a manufacturing process for the heat exchanger 20 according to Embodiment 1. Then, the manufacturing process for the heat exchanger 20 according to Embodiment 1 will be described.

Figure 2:
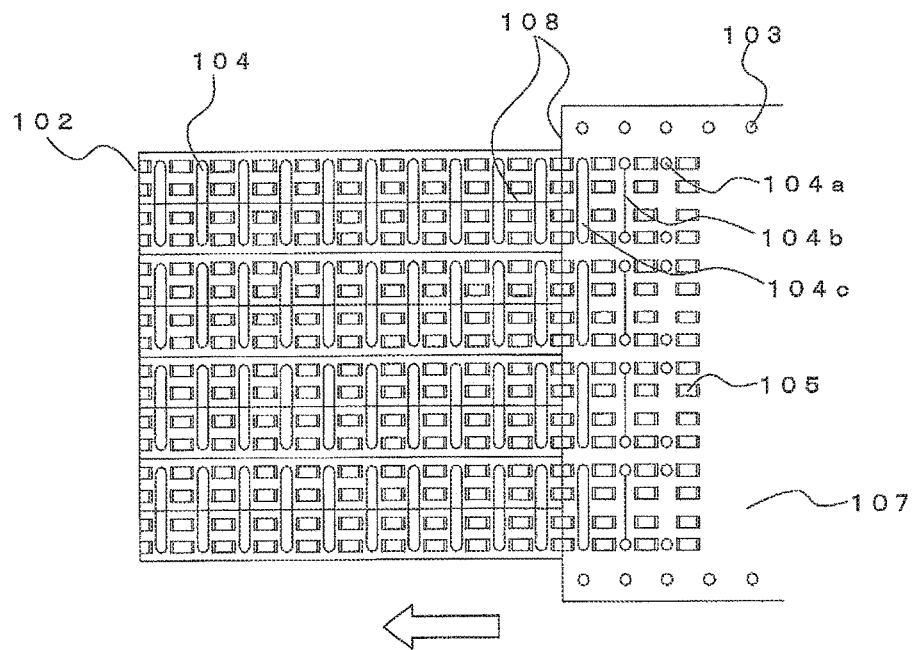
FIG. 2 is an explanatory drawing for explaining a pressing step by a progressive pressing device, which is executed when fabricating plate-like fins of a conventional heat exchanger.

FIG. 2 is an explanatory drawing for explaining a pressing step by a progressive pressing device, which is executed when fabricating plate-like fins of a conventional heat exchanger.

Plate-like fins 102 of a conventional heat exchanger are generally fabricated by being cut out from a thin plate 107 (plate-like member) such as an aluminum thin plate that is wound in a loop around a reel. Specifically, first, a plurality of pilot holes 103 are formed along the feed direction of the thin plate 107, at positions near an end portion of the thin plate 107. Then, the thin plate 107 is fed intermittently inside a progressive pressing device by using the pilot holes 103 (for example, by inserting a pin or the like into each of the pilot holes 103). The progressive pressing device has a plurality of dies provided along the feed direction of the thin plate 107. The plate-like fins 102 are formed by pressing the thin plate 107 successively with these dies while intermittently feeding the thin plate 107 inside the progressive pressing device.

More specifically, as illustrated in FIG. 2, the pressing step by the progressive pressing device is performed as follows. First, in the first pressing step, cut-and-raised slits 105 are formed in the thin plate 107. Then, in the next pressing step, in order to form an opening 104c having the shape of an elongated circle which becomes each of notches 104, a circular opening 104a that becomes an end portion of the opening 104c is formed. Then, in the next pressing step, an incision 104b is formed so as to straddle two circular openings 104a. Then, in the next pressing step, the area in the vicinity of the incision 104b is cut and raised, thereby forming the opening 104c having the shape of an elongated hole. Then, in the finial pressing step by the progressive pressing device, the thin plate 107 is cut along a cutting position 108 so that the opening 104c having the shape of an elongated hole is severed in the direction of the short axis, thereby cutting out each of the plate-like fins 102 from the thin plate 107. When cutting out the plate-like fins 102 of the conventional heat exchanger from the thin plate 107, normally, as illustrated in FIG. 2, the plate-like fins 102 are cut out in such a way that the direction in which the thin plate 107 is fed intermittently coincides with the longitudinal direction of the plate-like fins 102.

After forming the plate-like fins 102 with the progressive pressing device in this way, the conventional heat exchanger is assembled by, for example, a method described in Patent Literature 1, outside the progressive pressing device. That is, the conventional heat exchanger is assembled by disposing the plate-like fins 102 at a predetermined fin pitch, and then inserting the flat heat exchanger tubes into the corresponding notches 104 formed in an end portion along the long side of each of these plate-like fins. However, the plate-like fins 102 warp because the plate-like fins 102 are thin plates, making it difficult to dispose the plate-like fins 102 with good accuracy. Consequently, upon disposing the plate-like fins 102 at a predetermined fin pitch, there are variations in the positions of the notches 104 of individual plate-like fins 102 into which the same flat heat exchanger tube is to be inserted. Therefore, when attempting to insert the flat heat exchanger tubes into the notches 104, the force exerted when inserting the flat heat exchanger tubes causes the plate-like fins 102 to deform, or produces unevenness or any inappropriateness in the fin pitch between the plate-like fins 102. That is, the ventilation resistance increases, leading to performance degradation of the heat exchanger.

Accordingly, in Embodiment 1, the heat exchanger 20 is manufactured by the following steps.

Figure 3:
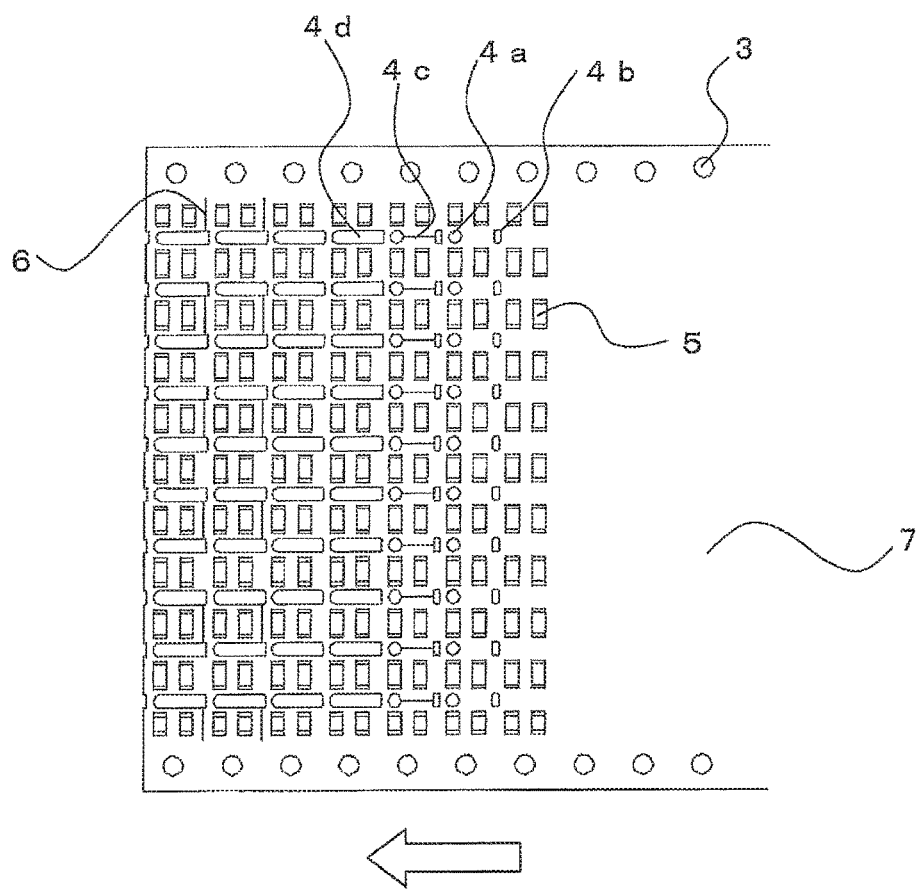
FIG. 3 is an explanatory drawing for explaining a pressing step by a progressive pressing device, which is executed when fabricating plate-like fins of the heat exchanger according to Embodiment 1 of the present invention.
Figure 4:
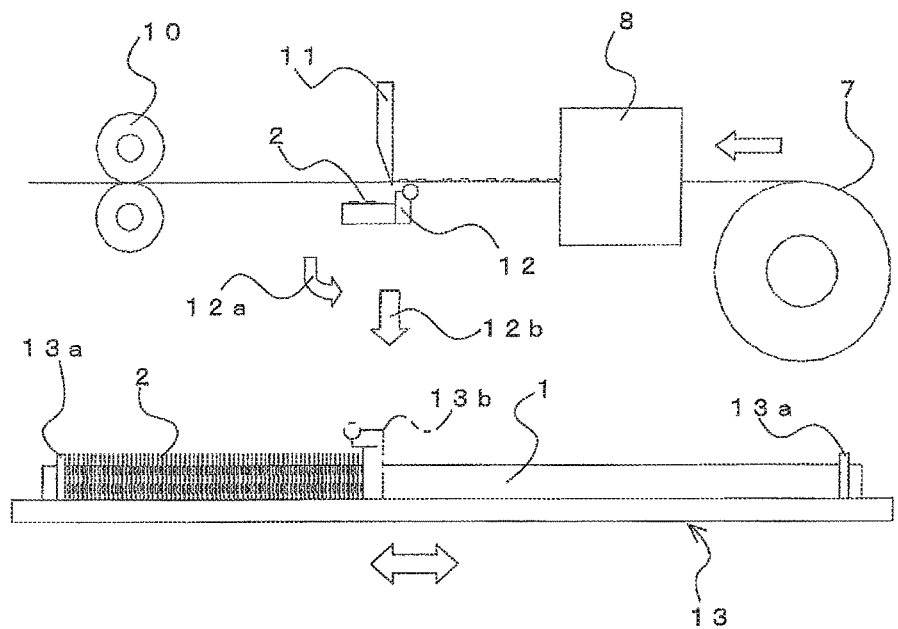
FIG. 4 is an explanatory drawing for explaining an assembly line for the heat exchanger according to Embodiment 1 of the present invention.

FIG. 3 is an explanatory drawing for explaining a pressing step by a progressive pressing device, which is executed when fabricating the plate-like fins of the heat exchanger according to Embodiment 1 of the present invention. FIG. 4 is an explanatory drawing for explaining an assembly line for the heat exchanger according to Embodiment 1 of the present invention.

Like the conventional plate-like fins 102, the plate-like fins 2 of the heat exchanger 20 according to Embodiment 1 are also fabricated by being cut out from a thin plate 7 (plate-like member) such as an aluminum thin plate that is wound in a loop around a reel. However, unlike the conventional plate-like fins 102, the plate-like fins 2 are cut out from the thin plate 7 outside a progressive pressing device 8. Specifically, first, a plurality of pilot holes 3 are formed along the feed direction of the thin plate 7, at positions near an end portion of the thin plate 7. Then, a fin feeding mechanism 10 provided in the downstream of the progressive pressing device 8 feeds the thin plate 7 intermittently by using the pilot holes 3 (for example, by inserting a pin or the like into each of the pilot holes 3). As a result, the thin plate 7 is fed intermittently inside the progressive pressing device.

The progressive pressing device 8 according to Embodiment 1 also has a plurality of dies provided along the feed direction of the thin plate 7. The plate-like fins 2 are formed by pressing the thin plate 7 successively with these dies while intermittently feeding the thin plate 7 inside the progressive pressing device 8. In Embodiment 1, steps up to tentative cutting that cuts a part of the outer periphery of the plate-like fins 2 are performed by the progressive pressing device 8.

More specifically, as illustrated in FIG. 3, a pressing step by the progressive pressing device 8 is executed as follows. First, in the first pressing step, the cut-and-raised slits 5 are formed in the thin plate 7. Then, in the next pressing step, in order to form an opening 4d that becomes each of the notches 4, a circular opening 4a and a rectangular opening 4b which become end portions of the opening 4d are formed. Then, in the next pressing step, an incision 4c is formed so as to straddle the opening 4a and the opening 4b. Then, in the next pressing step, the area in the vicinity of the incision 4c is cut and raised, thereby forming the opening 4d having a shape corresponding to the shape of the notches 4. Then, in the finial pressing step by the progressive pressing device, an incision 6 is formed at a position that becomes a part of the outer periphery of each of the plate-like fins 2 (tentative cutting).

Figure 5:
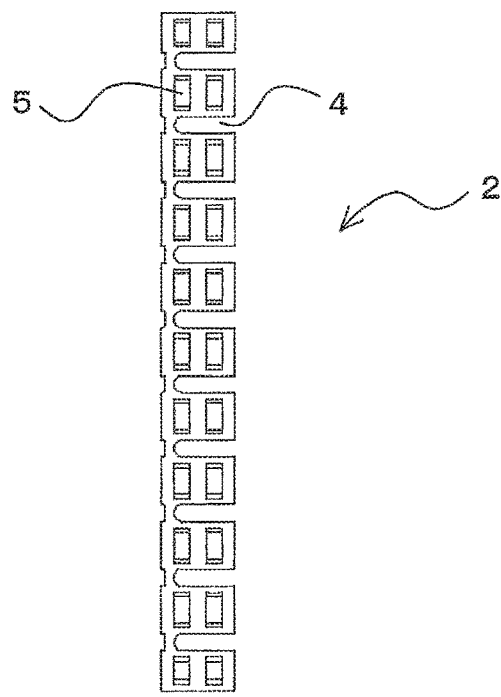
FIG. 5 illustrates a plate-like fin of the heat exchanger according to Embodiment 1 of the present invention.

The thin plate 7 that has been machined to this state exits the progressive pressing device 8, and is carried to a cutting device 11 that is provided outside (that is, in the downstream of) the progressive pressing device 8. Then, in the cutting device 11, each of the plate-like fins 2 is cut at the position of a part of its outer periphery excluding the position of the incision 6, thereby cutting out each of the plate-like fins 2 in the shape as illustrated in FIG. 5. In Embodiment 1, when cutting out the plate-like fins 2 from the thin plate 7 by the cutting device 11, as illustrated in FIG. 3, the plate-like fins 2 are cut out one by one in such a way that the direction in which the thin plate 7 is intermittently fed coincides with the direction along the short side of the plate-like fins 102. By cutting out the plate-like fins 2 in this way, the length of cut made by the cutting device 11 can be shortened, thereby enabling a reduction in the size/weight of the cutting device 11. That is, the manufacturing line for the heat exchanger 20 can be reduced in size/weight. Further, by reducing the length of cut made by the cutting device 11, the plate-like fins 2 can be cut out in a stable manner, that is, with good accuracy.

The plate-like fins 2 fabricated in this way are attached to the flat heat exchanger tubes 1 as follows, for example.

Specifically, the manufacturing line for the heat exchanger 20 according to Embodiment 1 has a table 13. The flat heat exchanger tubes 1 are disposed with a predetermined spacing from one another on the top portion of the table 13, and the flat heat exchanger tubes 1 are fixed in place with a fixing jig 13a. Further, the surface of each of the flat heat exchanger tubes 1 disposed on top of the table 13 is coated with a brazing filler metal. The table 13 includes, for example, a direct-acting actuator (for example, an actuator driven by an electric motor such as a servo motor), and is movable along the axial direction of the flat heat exchanger tubes 1 (in other words, the stacking direction of the plate-like fins 2). An inserting device 12 is provided above the table 13. The inserting device 12 includes a gripping mechanism for gripping each of the plate-like fins 2 which has been cut out by the cutting device 11, a rotating mechanism (for example, a mechanism using an electric motor such as a cam or a servo motor) for rotating the plate-like fin 2 being gripped so that the opening-side end portion of the notches 4 faces down, and a moving mechanism for moving the gripping mechanism and the rotating mechanism upward and downward by, for example, a direct-acting actuator or the like.

Therefore, by using the inserting device 12 to grip each of the plate-like fins 2 which has been cut out by the cutting device 11, rotate the plate-like fin 2 being gripped so that the opening-side end portion of the notches 4 faces down (see an arrow 12a in FIG. 4), and move each of the plate-like fins 2 downward to a position above the table 13 (see an arrow 12b in FIG. 4), the flat heat exchanger tubes 1 can be inserted into the corresponding notches 4 of each of the plate-like fins 2 in the direction along the long axis of their cross-section, thereby attaching each of the plate-like fins 2 to the flat heat exchanger tubes 1 disposed on top of the table 13. Then, as the table 13 moves in the axial direction of the flat heat exchanger tubes 1 while the inserting device 12 repeats this attaching step of the plate-like fins 2, that is, while the next one of the plate-like fins 2 is attached to the flat heat exchanger tubes 1 after a given one of the plate-like fins 2 is attached to the flat heat exchanger tubes 1, the plate-like fins 2 are attached to the flat heat exchanger tubes 1 at a predetermined fin pitch.

The above configuration of the inserting device 12 is merely an example. The inserting device 12 may be configured by, for example, a gripping mechanism and a rotating mechanism. Further, in the process of rotating each of the plate-like fins 2 by the rotating mechanism, that is, in the process of lowering each of the plate-like fins 2 in an arcuate trajectory, the flat heat exchanger tubes 1 may be inserted into the corresponding notches 4 of each of the plate-like fins 2 in the direction along the long axis of their cross-section, thereby attaching each of the plate-like fins 2 to the flat heat exchanger tubes 1 disposed on top of the table 13. In the case of adopting this configuration, the rotating mechanism may be rotated in a direction opposite to the direction of the arrow 12a, that is, in such a direction that as the plate-like fin 2 being gripped by the gripping mechanism of the inserting device 12 is lowered in an arcuate trajectory, the plate-like fin 2 moves closer to the plate-like fins 2 that have already been attached to the flat heat exchanger tubes 1. This makes it possible to prevent interference between the plate-like fin 2 being gripped by the gripping mechanism of the inserting device 12 and the plate-like fins 2 that have already been attached to the flat heat exchanger tubes 1.

Once a predetermined number of plate-like fins 2 are attached to the flat heat exchanger tubes 1 disposed on top of the table 13, the attaching step of the plate-like fins 2 using the inserting device 12 and the table 13 ends. After this attaching process ends, the plate-like fins 2 attached to the flat heat exchanger tubes 1 are fixed in place, with a clamp 13b and the fixing jig 13a on the other side, and the flat heat exchanger tubes 1 and the plate-like fins 2 are brazed by heating in a furnace. The heat exchanger 20 is completed in this way. The flat heat exchanger tubes 1 and the plate-like fins 2 may be fixed in place, with an adhesive or the like.

As described above, in Embodiment 1, the flat heat exchanger tubes 1 that has a higher rigidity (less prone to warping) than the plate-like fins 2 are disposed with a predetermined spacing from one another, and the plate-like fins 2 are attached to the flat heat exchanger tubes 1 one by one. That is, in Embodiment 1, the flat heat exchanger tubes 1, which can be disposed accurately with a predetermined spacing from one another, are disposed with a predetermined distance, and the plate-like fins 2 are attached to the flat heat exchanger tubes 1 one by one. Therefore, deformation of the plate-like fin 2 or occurrence of unevenness or any inappropriateness in fin pitch during assembling of the heat exchanger 20 can be more reduced than in the related art, thereby minimizing performance degradation of the heat exchanger 20 in comparison to related art. As a result, the heat exchanger 20 with high performance can be obtained.

In the method for manufacturing for the heat exchanger 20 according to Embodiment 1 described above, the plate-like fins 2 are attached to the flat heat exchanger tubes 1 in the step of disposing the plate-like fins 2 at a predetermined fin pitch. That is, the method for manufacturing for the heat exchanger 20 according to Embodiment 1 described above can simultaneously execute the "step of disposing the plate-like fins at a predetermined fin pitch" and the "step of attaching the flat heat exchanger tubes to the plate-like fins disposed at a predetermined fin pitch". As a result, the manufacturing time for the heat exchanger 20 can be shortened.

In Embodiment 1, the plate-like fins 2 are attached one by one to the flat heat exchanger tubes 1 disposed with a predetermined spacing from one another, by using the inserting device 12 and the table 13. However, any method may be used to attach the plate-like fins 2 one by one to the flat heat exchanger tubes 1 disposed with a predetermined spacing from one another. For example, the plate-like fins 2 may be attached one by one to the flat heat exchanger tubes 1 disposed with a predetermined spacing from one another manually by, for example, using a jig or the like. In this case, there is no particular need to cut out the plate-like fins 2 from the thin plate 7 one by one by the cutting device 11. The plate-like fins 2 may be cut out by, for example, the progressive pressing device 8.

Embodiment 2

When cutting out the plate-like fins 2 from the thin plate 7 by using the cutting device 11, the cutting device 11 (that is, the manufacturing line for the heat exchanger 20) can be reduced in size/weight by cutting out the plate-like fins 2 as follows. It is to be noted that components not particularly described in Embodiment 2 are the same as those in Embodiment 1, and the same reference signs are used for describing identical functions or components.

Figure 6:
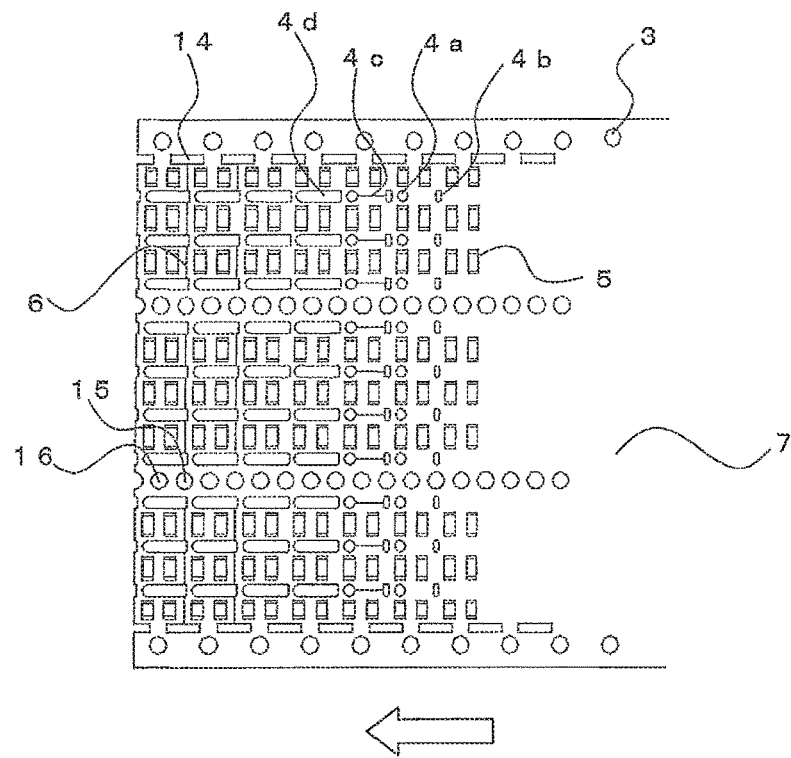
FIG. 6 is an explanatory drawing for explaining a pressing step by a progressive pressing device, which is executed when fabricating plate-like fins of a heat exchanger according to Embodiment 2 of the present invention.

FIG. 6 is an explanatory drawing for explaining a pressing step by a progressive pressing device, which is executed when fabricating plate-like fins of a heat exchanger according to Embodiment 2 of the present invention.

The pressing step by the progressive pressing device 8 according to Embodiment 2 is basically the same as the pressing step by the progressive pressing device 8 according to Embodiment 1 mentioned above. However, the pressing step by the progressive pressing device 8 according to Embodiment 2 differs from Embodiment 1 in the inclusion of a step of forming tooling holes 14 and 15, and in the final step of tentatively cutting the plate-like fins 2 from the thin plate 7.

More specifically, as illustrated in FIG. 6, in Embodiment 2, the tooling holes 14 and 15 are formed by the progressive pressing device 8. The tooling hole 14 is formed at a position that becomes an end portion along the short side of the plate-like fins 2. The tooling hole 15 is formed at a position that becomes an end portion along the long side of the plate-like fins 2. Further, the incision 6 is formed at a position on the outer periphery of the plate-like fins 2 excluding the areas near the tooling holes 14 and 15. That is, in Embodiment 2, the plate-like fins 2 are tentatively cut so as to leave the minimum connection margin required for preventing warping of the plate-like fins 2 that have not yet been cut out from the thin plate 7 (the plate-like fins 2 in a tentatively cut state).

In Embodiment 2, the tooling hole 15 is formed also at a position that does not become the outer periphery of the plate-like fins 2. Further, the tooling hole 15 is also used as a pilot hole 16 to further prevent the plate-like fins 2 that have not been cut out from the thin plate 7 from warping when feeding the thin plate 7 intermittently. In the case of using the tooling hole located at a position that does not become the outer periphery of the plate-like fins 2 as the pilot hole 16, there is no particular need to form the tooling hole 15 at a position that does not become the outer periphery of the plate-like fins 2. In this case, each of the cut-and-raised slits 5 can be formed also at a position corresponding to the tooling hole 15 located at a position that does not become the outer periphery of the plate-like fins 2, thereby improving the heat exchange performance of the heat exchanger 20. When intermittently feeding the thin plate 7, as long as the plate-like fins 2 that have not been cut out from the thin plate 7 do not warp, the tooling hole 15 may not be used as the pilot hole 16. In this case as well, each of the cut-and-raised slits 5 can be formed also at a position corresponding to the tooling hole 15 located at a position that does not become the outer periphery of the plate-like fins 2, thereby improving the heat exchange performance of the heat exchanger 20. Further, the tooling hole 14 may be used as a pilot hole. In this case as well, each of the cut-and-raised slits 5 can be formed also at a position corresponding to the tooling hole 15 located at a position that does not become the outer periphery of the plate-like fins 2, thereby improving the heat exchange performance of the heat exchanger 20.

As described above, in Embodiment 2, the plate-like fins 2 can be cut out from the thin plate 7 by cutting the areas near the tooling holes 14 and 15 by the cutting device 11. That is, by forming the plate-like fins 2 as in Embodiment 2, the length of cut made by the cutting device 11 can be made shorter than that in Embodiment 1, thereby further reducing the size/weight of the cutting device 11 (that is, the manufacturing line for the heat exchanger 20).

In its completed state, the heat exchanger that provides the above-mentioned effect is provided with a notch (a notch different from each of the notches 4) constituting a part of the tooling hole 15, or the tooling hole 15 (a hole different from a hole created when each of the cut-and-raised slits 5 is formed).

The notch constituting a part of the tooling hole 15 corresponds to a second notch according to the present invention.

Embodiment 3

The heat exchanger 20 according to each of Embodiment 1 and Embodiment 2 mentioned above can be used in, for example, an air-conditioning apparatus described below.

Figure 7:
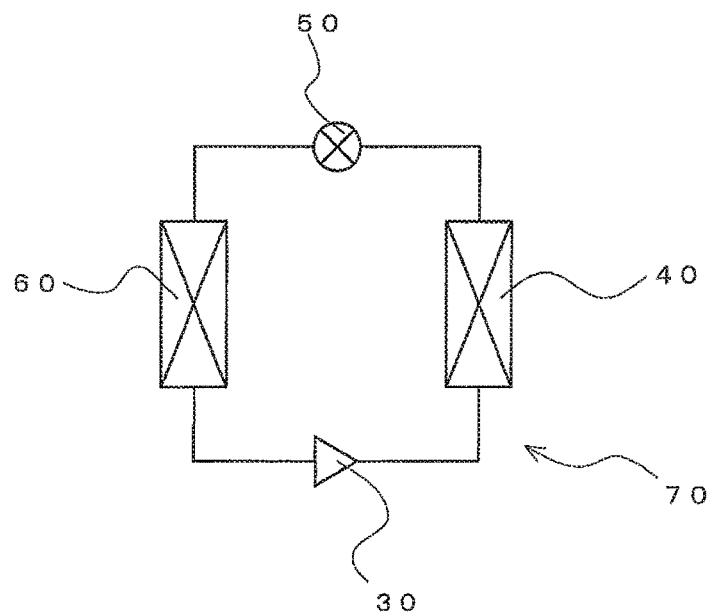
FIG. 7 is a refrigerant circuit diagram illustrating an air-conditioning apparatus according to Embodiment 3 of the present invention.

FIG. 7 is a refrigerant circuit diagram illustrating an air-conditioning apparatus according to Embodiment 3 of the present invention.

An air-conditioning apparatus 70 according to Embodiment 3 includes a compressor 30, a condenser 40 (which serves as one of an outdoor heat exchanger and an indoor heat exchanger), a pressure-reducing device 50, and an evaporator 60 (which serves as the other one of an outdoor heat exchanger and an indoor heat exchanger). The compressor 30 compresses a refrigerant that has exited the evaporator 60 described later. The condenser 40 causes heat to be exchanged between air and a high-temperature, high-pressure refrigerant compressed by the compressor 30, thereby condensing the high-temperature, high-pressure refrigerant. The pressure-reducing device 50 reduces the pressure of the high-pressure refrigerant condensed by the condenser 40, thus turning the high-pressure refrigerant into a low-temperature, low-pressure refrigerant. The evaporator 60 causes heat to be exchanged between air and the low-temperature, low-pressure refrigerant that has been reduced in pressure by the pressure-reducing device 50, thereby evaporating the low-temperature, low-pressure refrigerant. The heat exchanger 20 according to each of Embodiment 1 and Embodiment 2 mentioned above is used as at least one of the condenser 40 and the evaporator 60.

As described above, the air-conditioning apparatus 70 configured as in Embodiment 3 includes the heat exchanger 20 that makes it possible to reduce deformation of the plate-like fin 2 or occurrence of unevenness or any inappropriateness in fin pitch during assembling in comparison to related art, thereby minimizing degradation of heat exchange performance in comparison to related art. Therefore, the air-conditioning apparatus 70 obtained has a higher performance (higher heat exchange capacity) in comparison to related art.

REFERENCE SIGNS LIST 1 flat heat exchanger tube, 2 plate-like fin, 3 pilot hole, 4 notch, 4a opening, 4b opening, 4c incision, 4d opening, 5 cut-and-raised slit, 6 incision, 7 thin plate, 8 progressive pressing device, 10 fin feeding mechanism, 11 cutting device, 12 inserting device, 13 table, 13a fixing jig, 13b clamp, 14 tooling hole, 15 tooling hole, 16 pilot hole, 20 heat exchanger, 30 compressor, 40 condenser, 50 pressure-reducing device, 60 evaporator, 70 air-conditioning apparatus, 102 plate-like fin (related art), 103 pilot hole, 104 notch, 104a opening, 104b incision, 104c opening, 105 cut-and-raised slit, 107 thin plate, 108 cutting position.

The invention claimed is:

1. A method for manufacturing a heat exchanger, the heat exchanger including
a plurality of plate-like fins that are stacked with a predetermined fin pitch, and
a plurality of heat exchanger tubes that are disposed with a predetermined spacing from one another along a longitudinal direction of the plate-like fins, and extend through the plate-like fins along a stacking direction of the plate-like fins,
the heat exchanger tubes having a cross-section that is flat-shaped,
the plate-like fins each having a plurality of first notches formed in an end portion along a long side thereof, the first notches having a shape corresponding to a shape of the cross-section of the heat exchanger tubes,
the heat exchanger tubes being inserted into the first notches,
the method comprising:
forming, in a pressing device, a hole that becomes each of the first notches in a plate-like member while intermittently feeding the plate-like member,
tentatively cutting, in the pressing device, the plate-like member after forming an incision and a tooling hole in the plate-like member, the incision and the tooling hole forming a part of an outer periphery of each of the plate-like fins, cutting out, by the cutting device, the plate-like fins from the plate-like member that has been tentatively cut, by cutting a portion of the plate-like member in which the hole that becomes each of the first notches is formed near the tooling hole, disposing the heat exchanger tubes with the predetermined spacing from one another, and attaching the plate-like fins to the heat exchanger tubes one by one, by inserting the heat exchanger tubes into the first notches of each of the plate-like fins.

2. The method of claim 1, wherein:

the pressing device includes a feed mechanism that intermittently feeds the plate-like member by using a pilot hole formed in the plate-like member; and the tooling hole also serves as the pilot hole.

3. The method of claim 1, wherein the plate-like fins are cut out from the plate-like member in such a way that a direction in which the plate-like member is intermittently fed coincides with a direction along a short side of the plate-like fins.

4. The method of claim 1, wherein the heat exchanger is manufactured to comprise:

a table on top of which the heat exchanger tubes are disposed with the predetermined spacing from one another, the table being movable in an axial direction of the heat exchanger tubes; and an inserting device that is provided above the table, the inserting device being configured to grip each of the plate-like fins cut out by the cutting device and attach each of the plate-like fins to the heat exchanger tubes disposed on the table.

\* \* \* \* \*